United States Patent
Upadhyay et al.

(10) Patent No.: US 9,251,280 B1
(45) Date of Patent: Feb. 2, 2016

(54) METHOD FOR BOOKMARK DETECTION AND CORRECTION FOR A CLIENT DEVICE

(75) Inventors: Piyush Upadhyay, Mission, KS (US); Badri P. Subramanyan, Overland Park, KS (US); Hemanth Balaji Pawar, Herndon, VA (US); Shilpa Kowdley Srinivas, Herndon, VA (US); Vivek J. Kurisunkal, Reston, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 2393 days.

(21) Appl. No.: 12/118,163

(22) Filed: May 9, 2008

(51) Int. Cl.
*G06F 9/54* (2006.01)
*G06F 17/30* (2006.01)

(52) U.S. Cl.
CPC .............................. *G06F 17/30884* (2013.01)

(58) Field of Classification Search
CPC ................................................ G06F 17/30884
See application file for complete search history.

(56) References Cited

U.S. PATENT DOCUMENTS

| | | | |
|---|---|---|---|
| 5,813,007 A | 9/1998 | Nielsen | |
| 6,041,360 A | 3/2000 | Himmel et al. | |
| 6,658,402 B1 | 12/2003 | Dutta | |
| 6,981,210 B2 | 12/2005 | Peters et al. | |
| 7,028,032 B1 | 4/2006 | Diedrich et al. | |
| 7,177,901 B1 | 2/2007 | Dutta | |
| 7,310,516 B1 | 12/2007 | Vacanti et al. | |
| 2008/0172404 A1* | 7/2008 | Cohen | 707/102 |

OTHER PUBLICATIONS

Sabestian, The anatomy of server sided redirect: 301, 302 and 307 illuminated SEO wise, Oct. 9, 2007, Pages All.*
Jukka k. Korpela, Undo 301 redirec, Apr. 11, 2007.*

* cited by examiner

*Primary Examiner* — Syed Roni

(57) ABSTRACT

A method is disclosed for receiving at a network gateway a message generated in response to a content request, wherein the content request was generated by a client device in response to invocation of an invalid bookmarked link on a browser. The gateway may then modify the message by inserting bookmark-update data that instructs the client device to update the bookmarked link. Finally, the gateway may send the modified message to the client device, whereby the client device may update the bookmarked link.

19 Claims, 9 Drawing Sheets

METHOD FOR BOOKMARK DETECTION AND CORRECTION FOR A CLIENT DEVICE

BACKGROUND

The widespread availability of the Internet and mobile communications has ushered in an era of convenience and productivity never before seen. At the same time, however, the widespread use of data communications has strained both the capacity of communications channels used for data communications and the telecommunications equipment, such as network servers and gateways, that service those channels. As users of phones, computers, and other client devices continue to download more content (such as data, web site content, email, etc.), service and content providers demand greater efficiency within their data communications so that they do not exceed channel capacity and equipment limitations.

One source of inefficient data communications stems from user bookmarks related to web (internet) browsing. Typically, internet bookmarks are stored Web page locations (URLs) that can be easily retrieved by a user. As a feature of all modern Internet web browsers, the bookmark's primary purpose is to catalog and access web pages that a user has visited and chosen to save. Bookmarks are normally visible in a browser menu and stored on the user's computer or other browsing device. Every major browser has a built-in tool for managing the list of bookmarks. The list storage method varies depending on the browser. When a user invokes a bookmark, the browser is normally directed to the link address stored by the bookmark.

A particular problem arises when the user has bookmarked an address that is no longer valid, either because the address no longer functions or exists or because the service or content provider desires that the user be directed to an alternative address. When the browser attempts to contact the invalid bookmarked address, it will receive a response other than the desired content response. For example, the browser may receive a redirect message, which normally results in the browser sending a new request to the redirect address contained within the redirect message. This signaling pattern results in extraneous messaging and results in inefficient data communications. This problem is particularly significant because when the user has bookmarked an invalid link, the user will presumably continue to invoke it.

OVERVIEW

To help avoid inefficient communications related to invalid bookmarked links, it would be advantageous to provide a method whereby a service or content provider may cause an invalid bookmarked link to be updated.

Disclosed herein is a method for detecting and correcting bookmarks. According to the method, a network gateway, or other network intermediary such as a proxy or a portal, may receive, from a client device, a content request that is directed to a first network address. The gateway may then determine that the content request was generated in response to invocation of a bookmarked link and may also forward the content request to the first network address. The gateway may receive a redirect message generated in response to the content request, wherein the redirect message designates a second network address as a redirect address. Responsive to the determination that the content request was generated in response to invocation of a bookmarked link, the gateway may establish a modified redirect message that includes bookmark-update data instructing the client device to update the bookmarked link to point to the second network address. The gateway may then send the modified redirect message rather than the received redirect message to the client device, whereby, upon receipt of the modified redirect message, the client device may responsively update the bookmarked link to point to the second network address.

Also disclosed herein is another method for detecting and correcting bookmarks. According to the method, a network gateway may receive, from a client device, a content request that is directed to a first network address. The gateway may then determine that the content request was generated in response to invocation of a bookmarked link and may also forward the content request to the first network address. The gateway may receive a redirect message generated in response to the content request, wherein the redirect message designates a second network address as a redirect address. The gateway may then forward the content request from the network gateway to the second network address and also receive a response to the content request. Responsive to the determination that the content request was generated in response to invocation of a bookmarked link and to the receipt of the response to the forwarded content request, the gateway may establish a modified response message that includes bookmark-update data instructing the client device to update the bookmarked link to point to the second network address. The gateway may then send the modified response message rather than the received response to the client device, whereby, upon receipt of the modified response message, the client device may responsively update the bookmarked link to point to the second network address.

Also disclosed is a network gateway capable of instructing a client device to correct invalid bookmarks. The network gateway may comprise: a network interface for providing connectivity with a network; a processor; data storage; and program instructions stored in the data storage. The program instructions may be executable by the processor to carry out functions including: (i) receiving at the network gateway a redirect message generated in response to a content request, wherein the content request originated from a mobile station; (ii) modifying the redirect message by inserting bookmark-update data that instructs the mobile station to update a bookmarked link; and (iii) sending the modified redirect message to the mobile station.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

Exemplary embodiments of the present invention are described herein with reference to the drawings, in which.

DETAILED DESCRIPTION

Figure 1:
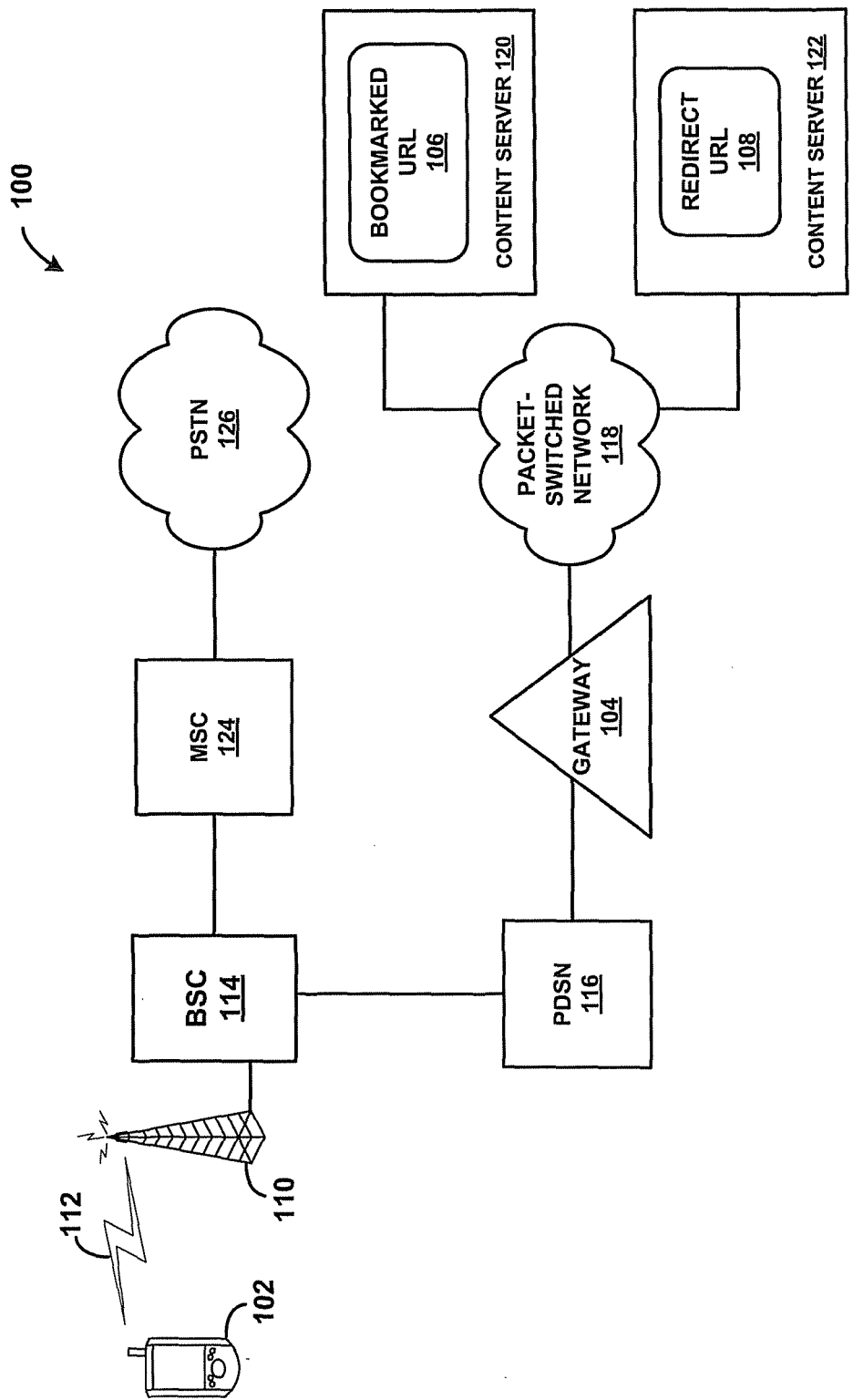
FIG. 1 is a block diagram of an exemplary communication system.

Referring to the drawings, as noted above, FIG. 1 is a simplified block diagram of a communications network in which the present method can be implemented. It should be understood, however, that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, various functions may be carried out by a processor executing program instructions stored in memory or another machine-readable medium.

As shown in FIG. 1, the exemplary network illustrates a system 100 in which the communication path of one embodiment of this invention can be implemented. While FIG. 1 depicts one client device 102 accessing the wireless network for voice and/or data services, the wireless network may simultaneously provide service to a plurality of different client devices.

By way of example, the client device 102 of FIG. 1 may be a 3G or more advanced mobile client device such as a cellular or PCS telephone or personal digital assistant (e.g., Palm®, Pocket PC®, Windows Mobile®, or Android type device) for instance. As such, the client device 102 will likely have a relatively small display screen. Additionally, because the display screen will likely be too small to display full size HTML pages, the mobile station will likely be equipped with a "microbrowser," which is a web browser tailored to present web content on a smaller handset display. An exemplary microbrowser is the Openwave™ Mobile Browser available from Openwave Systems Inc., which can be arranged to provide mobile information access through compliance with the industry standard Wireless Application Protocol (WAP) as well as various markup languages such as HDML, WML, XHTML, and cHTML. Opera® Mobile, Opera Mini™, and Mozilla Fennec are other examples of microbrowsers.

As another example, the client device 102 of FIG. 1 could be a full scale computing platform, such as a desktop or notebook personal computer, equipped with a wireless communication interface to facilitate communication over the wireless network. For instance, a personal computer could be linked to a 3G or more advanced handheld device, or the personal computer could include a plug-in card (e.g., PCI card or PCMCIA such as the AirCard® available from Sierra Wireless, Inc.) that provides for wireless communication. Further, the client device 102 might have a full scale web browser such as Microsoft Internet Explorer®, Netscape Navigator®, Opera® Web Browser, Mozilla Firefox®, or Apple Safari®, for instance, which can conventionally receive and interpret HTML web content.

The client device 102 may communicate with an access point for the wireless network, such as a base station 110, through an air interface 112. The air interface might carry wireless communications in compliance with any radio communication protocol. This description will consider CDMA by way of example. CDMA is merely one example of a protocol that can be used for communication between the client device 102 and the access point 110. The client device 102 and the base station 110 may alternatively or additionally communicate using Wideband CDMA ("WCDMA"), Time Division-Synchronous CDMA ("TD-SCDMA"), Advanced Mobile Phone Service ("AMPS"), Digital AMPS ("D-AMPS"), Global System for Mobile Communication ("GSM"), IS-136, Wireless Application Protocol ("WAP"), time division multiple access ("TDMA"), Worldwide Interoperability for Microwave Access ("WiMAX"), Integrated Digital Enhanced Network ("iDEN"), or other protocols. Additional wireless protocols, such as any IEEE 802.11 protocols, Bluetooth™, or others, may also be used.

CDMA provides a method for sending wireless signals between the client device 102 and the base station 110. In a CDMA system, the base station 110 communicates with the client device 102 over a spread spectrum of frequencies. In such a CDMA system, multiple client devices may use the same frequency range, and the multiple client devices may each simultaneously communicate with the base station 110 using the same frequency range. Spreading the signal across a wide bandwidth can reduce interference between signals from different client devices.

CDMA is described in further detail in Telecommunications Industry Association ("TIA") standards IS-95A and IS-95B, which are both incorporated herein by reference in their entirety. CDMA is also described in the International Telecommunications Union ("ITU") IMT-2000 series of standards, which are all incorporated herein by reference in their entirety. CDMA is further described in the TIA IS-2000 series of standards, which are all incorporated herein by reference in their entirety. The IS-2000 series of standards are commonly referred to as CDMA2000.

The base station 110 of FIG. 1 may be coupled to a base station controller (BSC) 114, which can perform various functions, such as managing handoffs of the client device 102 as it moves among base stations in the wireless network. The BSC 108, in turn, may connect to a mobile switching center ("MSC") 124. The MSC 124 can manage setup and teardown of connections with the client device 102. While the BSC 108 and the MSC 124 are depicted as separate components, it is possible that their functionality may be combined into a single component.

If required, the MSC 124 may provide connectivity to the public switched telephone network (PSTN) 126. Through this connectivity, the client device 102 may first access the wireless network for voice services and then establish a circuit-switched connection with another device on the PSTN 126, on the wireless network, or on another network.

Preferably, the client device 102 may establish a data connection with the wireless network in order to engage in packet-switched communications with another entity, such as the content server 120 or the content server 122. To establish such a data connection, the BSC 108 may interface with a packet data serving node (PDSN) 116. The PDSN 116 can provide connectivity to a packet-switched network 118, which may comprise either or both of a private packet-switched network and a public packet-switched network, such as the Internet.

More specifically, each client device that supports packet-data connectivity can engage in packet-data communication over a packet network, such as the packet-switched network 118, after acquiring a radio link over an air interface and a data link with a PDSN. For example, client device 102 can send an origination message to BSC 108 and/or MSC 124 asking for a radio link for packet-data communication. The BSC 108 can then responsively instruct the client device 102 to operate on a given traffic channel over the air interface 112. Through that traffic channel, the client device 102 might then negotiate with PDSN 116 to establish a data link.

In the exemplary communication described by FIG. 1, a network gateway may be disposed in the data connection path between the client device 102 and the content server 120 or the content server 122. For example, gateway 104 may be located between the PDSN 116 and the packet-switched network 118. Alternatively, and not shown in FIG. 1, the gateway 104 may be part of the PDSN 116. As another alternative, also not shown in FIG. 1, the gateway 104 may be communicatively coupled to the packet-switched network 118, such that data communications between the client device 102 and content servers connected to the packet-switched network 118 are routed through the gateway 104.

An example of the gateway 104 in the present invention might be a WAP gateway. A WAP gateway, in addition to carrying out the functions described in the present invention, may also transcode web content being sent from the content servers 120 or 122 to the client device 102. This transcoding serves to put the transmitted web content and HTTP signaling into a form suitable for reference by, for example, a micro-browser on the client device 102.

Alternatively or additionally, the gateway 104 might function as a proxy server. Such a proxy server may be added anywhere within the HTTP communication path between the client device 102 and the content servers 120 and 122. Further, gateway 104 may be multiple proxy servers.

Alternatively or additionally, the gateway 104 might function as a web portal. Such a portal may be added anywhere within the HTTP communication path between the client device 102 and the content servers 120 and 122.

FIG. 1 may be further used to describe the flow of an exemplary request for content sent from the client device 102 and directed to the content servers 120 or 122. To engage in packet-based communications on the packet-switched network, the client device 102 might use various protocols to engage in data communications with other entities, such as the content servers 120 and 122. In accessing the wireless network for data services, the client device 102 may establish a Point-to-Point Protocol ("PPP") session with the PDSN 116. As is known in the art, PPP can be used as a data link protocol for communication between two devices. PPP can provide a method for framing data sent between the two devices. Additionally, it can implement a link control protocol for controlling transmission links between the two devices, and it can provide a way to negotiate higher level protocol options for communication between the two devices. PPP is described in more detail in Internet Engineering Task Force ("IETF") Request for Comments ("RFCs") 1661, 1662, and 1663, all of which are incorporated herein by reference in their entirety.

While the client device 102 may communicate with the PDSN 116 through a PPP session, it may communicate with other entities on the packet-switched network 118 using higher level protocols. For example, the client device 102 may use the Transmission Control Protocol (TCP)/Internet Protocol (IP) protocol suite for transmitting and receiving data over a packet-switched network. Under TCP/IP, each network entity, including the client device 102, may receive an IP address. The IP address assigned to an entity is usually unique, and therefore allows IP packets of data to be routed between different networks to a particular entity.

Additionally, the client device 102 may use the HTTP application-layer protocol to send messages over the TCP/IP protocol. The HTTP/1.1 protocol is defined by W3C's Network Working Group's RFC 2616, which is incorporated herein by reference in its entirety. The HTTP/1.0 protocol is defined in RFC 1945 and is also incorporated herein by reference in its entirety. An HTTP message packet can include a header portion and a data portion. The header portion generally identifies a source device and a destination device, while the data portion generally carries content data to be transmitted between the two entities. The header portion may also contain additional data in dedicated header fields.

Figure 2:
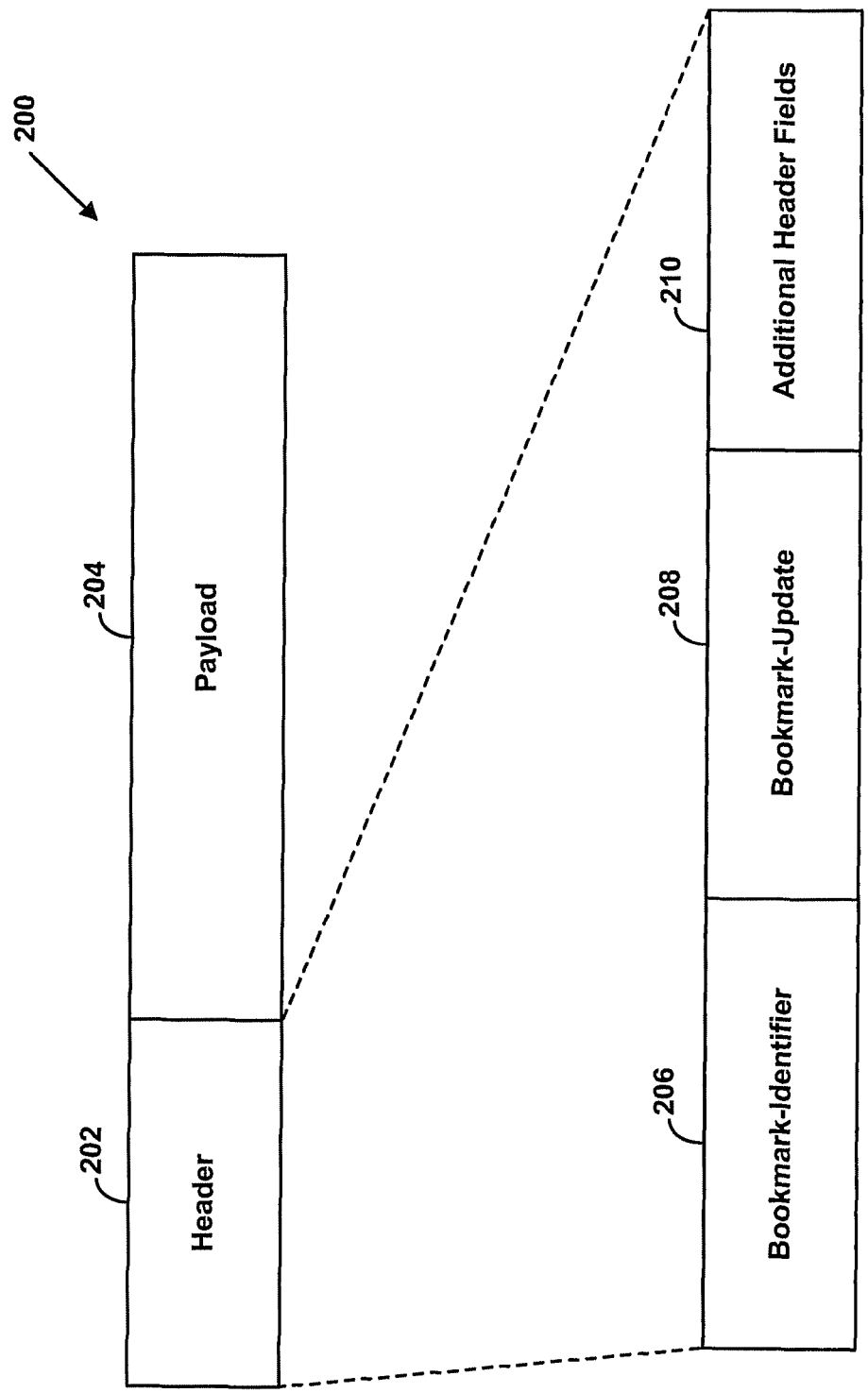
FIG. 2 is a block diagram illustrating the structure within an exemplary HTTP message packet.

FIG. 2 illustrates the structure of an example HTTP message packet 200. The header 202 may contain header fields and the payload 204 may contain data, such as content data. Each header field may be defined by a field name and may contain a field value and/or field data content. The exemplary HTTP embodiments described herein contemplate the use of header fields to transmit information about the whether a content request was sent in response to the user invoking a bookmarked link on the client device 102. For example, in addition to other header fields 210, header 202 may contain, in no particular sequence relative to other header fields, a Bookmark-Identifier header field 206. The following HTTP exemplary message packet shows a portion of a content request message which includes a Bookmark-Identifier header field 206 with a value of "YES":

GET http://vision.sprintpcs.com
Host: vision.sprintpcs.com
Accept: application/xhtml+xml
Accept-Charset: utf-8, utf-16, us-ascii, iso-8859-1,*
Bookmark-Identifier: YES
. . .

As an example, a client device 102, upon invocation of a bookmarked link, may include the Book-Identifier header field 206 within an HTTP GET content request message. The Book-Identifier header field 206 may then be used by the gateway 104 to determine that the HTTP GET request was generated in response to invocation of a bookmarked link. Such use will be further discussed in reference to FIG. 3 and subsequent figures.

The header 202 may additionally or alternatively contain, among other header fields and in no particular sequence, a Bookmark-Update header field 208. The following HTTP example message packet shows a portion of a content response message which includes a Bookmark-Update header field 208 with a value of "http://new_url.com":

HTTP/1.1 200 OK
Server: IBM_HTTP_Server/2.0.42.2-PK13230 Apache/2.0.47 (Unix) DAV/2
Content-Type: application/xhtml+xml;charset=UTF-8
Content-Language: en
Bookmark-Update: http://new_url.com As an example, the gateway 104 may insert the Bookmark-Update header field 208 into an HTTP 200 OK response message that the gateway 104 is forwarding on to the client device 102 from a content server. As another example, the gateway 104 may also insert the Bookmark-Update header field 208 into an HTTP 302 REDIRECT message that the gateway 104 is forwarding on to the client device 102 from a content server. Such uses will be further discussed in reference to FIG. 3 and subsequent figures.

Returning to FIG. 1, as a general matter, the gateway 104 preferably sits within an HTTP communication path between the client device 102 and a content server 120 and 122, so that it can detect and act on HTTP communications that pass between the client 102 and a content server 120 or 122. The HTTP communication path between the client device and the content server can take various forms. Generally speaking, it is the path along which a request for content passes from the client device 102 to the content server 120 or 122 and along which a response to the request passes from the content server 120 or 122 to the client device 102.

A request for content may be carried by a single HTTP request message that is sent from the client device 102 to the content server 120 or 122. Or the request for content may be carried in multiple HTTP request messages, such as one that is sent from the client device 102 to the gateway 104 and another that is then sent from the gateway 104 to the content server 120 or 122, for instance. Similarly, the requested content may be carried in an HTTP response message that is sent from the content server 120 or content server 122 to the client device 102. Or the content may be carried in multiple HTTP response messages, such as one that is sent from the content servers 120 or 122 to a gateway 104 and another that is then sent from the gateway 104 to the client device 102, for instance. Additional steps may exist as well. For example, the browser running on client device 102 may generate an HTTP GET request, seeking content from content server 120. The client device 102 may then open a Transmission Control Protocol (TCP) socket with content server 120 and send the GET request through the gateway 104 and through the packet-switched network 118 to the IP address of content server 120. It is further possible that the gateway 104 may not act transparently. Rather, separate TCP sockets may exist between the client device 102 and the gateway 104 on one hand and the gateway 104 and content server 120 on the other hand. Thus, the communication path may carry a request for content in an HTTP GET request from the client device 102 to the gateway 104 and then in another HTTP GET request from the gateway 104 to the content server 120.

As an example, a user of client device 102 may invoke a bookmark on client device 102, and responsive to the invoked bookmark, the browser running on client device 102 may generate a content request that is directed to a URL 106 (the "bookmarked URL") on content server 120. Upon receipt of the content request, the content server 120 may return an HTTP content response message to the client device 102. However, in some cases, the bookmarked URL 106 may no longer be a valid URL. In such cases, the content server 120 may return a redirect message, such as an HTTP 302 REDIRECT, to the client device 102. The redirect message generally includes a redirect URL address, such as redirect URL 108, wherein the content to be delivered responsive to the content request can be found at the redirect URL address. An updated request for content may then be sent from either the client device 102 or the gateway 104 requesting the content located at redirect URL 108 on content server 122.

Content server 120 and content server 122 are shown in FIG. 1 as separate and distinct servers for illustrative purposes only. Content servers 120 and 122 may be the same server, which includes both the bookmarked URL 106 and the redirect URL 108. For example, the bookmarked URL 106 may be addressed as http://www.abc.xyz.com and the redirect URL 108 may be addressed as http://www.xyz.com/abc, wherein both URLs are present on a single content server.

Figure 3:
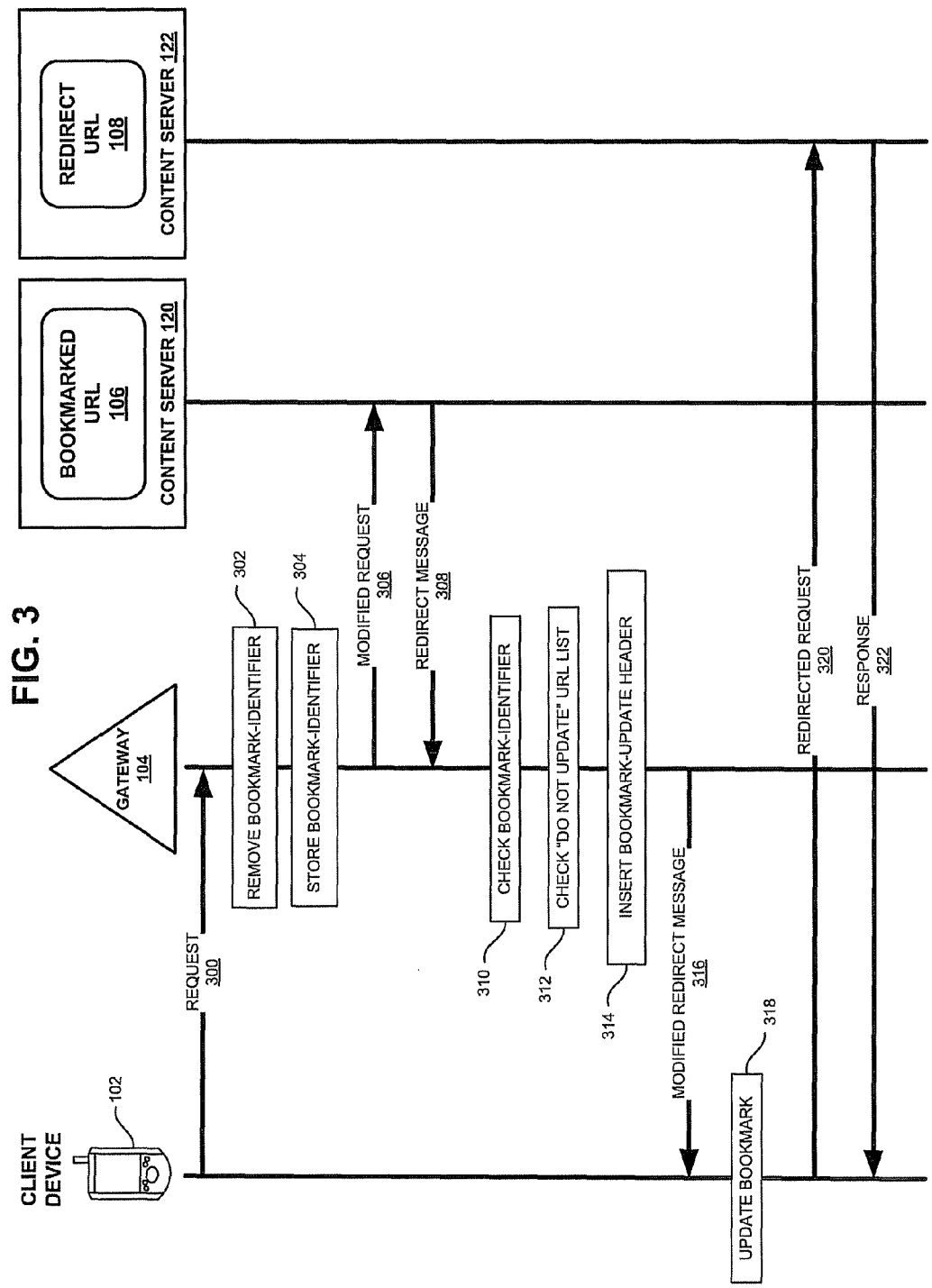
FIG. 3 is an exemplary message flow diagram illustrating an embodiment of the invention.

FIG. 3 is an exemplary message flow diagram illustrating an embodiment of this invention. When a user of client device 102 invokes a bookmarked link directed to a bookmarked URL, such as bookmarked URL 106, the client device 102 may establish and send a request message 300 addressed to bookmarked URL 106. The request 300 is preferably an HTTP request message, such as an HTTP GET request. The client device 102 may also send information that indicates that the request 300 was sent in response to invocation of a bookmarked link. Preferably, the client device 102 may insert a Bookmark-Identifier header field 206 into the request 300 to indicate that the request 300 was sent responsive to invocation of a bookmarked link. The Bookmark-Identifier 206 may include field content such as a "YES" value, a "TRUE" value, or some other indicator that positively indicates that the request 300 was responsive to invocation of a bookmarked link. For requests that are not responsive to invocation of a bookmarked link, the Bookmark-Identifier header field 206 may either contain a negative field content value (e.g., "NO" or "FALSE") or the Bookmark-Identifier header field 206 may be left out of the request entirely.

Prior to being received by the content server 120 holding the bookmarked URL 106, the request 300 may be received by the gateway 104. At block 302, the gateway 104 may read the header 202 of the request 300 and, if present, remove the Bookmark-Identifier header field 206 from the header 202, thus establishing a modified request 306. This may be done to prevent the transmission of bookmark-related data beyond the gateway 104. At block 304, the gateway 104 may also store the Bookmark-Identifier 206 information within a lookup table, so that the gateway 104 can determine at a later time whether the request 300 was generated in response to invocation of a bookmarked link. The lookup table may be any table that holds relevant information pertinent to a particular user session. For example, the lookup table may be a session state registry that is preferably located at the gateway 104. The gateway 104 may then forward the modified request 306 to the bookmarked URL 106 at the content server 120. Alternatively, the gateway may not remove the bookmark identifier data from the request 300. In such case, the gateway 104 may forward the request 300 as the modified request 306 shown in FIG. 3.

If the bookmarked URL 106 at content server 120 is an invalid URL, the content server 120 may return a redirect message 308, such as an HTTP 302 "FOUND" REDIRECT message, in response to the content request 306. The redirect message 308 may alternatively be a different type of redirect message, such as an HTTP 301 "MOVED PERMANENTLY" REDIRECT, an HTTP 307 "TEMPORARY" REDIRECT, or any other HTTP 3xx redirection message (as described in RFC 2616 or RFC 1945, or as described in future HTTP standards or protocols). The redirect message 308 may include a redirect URL 108 address that represents where the content request should be directed to.

The bookmarked URL 106 may be invalid for a variety of reasons. For example, as stated earlier, the bookmarked URL 106 may be invalid because the address no longer functions or exists at content server 120. Alternatively, the bookmarked URL 106 may be invalid because the content provider prefers that users not access the bookmarked URL 106 directly. For example, the content provider may prefer that a user access the bookmarked URL 106 only from a portal web page, as opposed to directly accessing the bookmarked URL 106 through a bookmarked link. This preference may be related to revenue-based traffic tracking or for other traffic management reasons. For example, client device 102 may be a mobile phone and the user of the mobile phone may bookmark "http://www.ringers.sprint.com" as bookmarked URL 106. However, the content provider may prefer that the user access bookmarked URL 106 by going to the service provider homepage and then clicking on the link for "Ringers," where the underlying URL might be "http://sprint.com/ringers." Thus the service provider is able to track traffic for the "sprint.com" portal and the redirect goes to bookmarked URL 106 "http://www.ringers.sprint.com" only after the traffic tracking has occurred.

Upon receipt of the redirect message 308, the gateway 104 may preferably determine at block 310 whether the content request 300 was generated in response to invocation of a bookmarked link. If the gateway 104 removed the Bookmark-Identifier header field 206 from the content request 300, the gateway 104 can, for example, consult the lookup table to make the determination. If the gateway 104 did not remove the Bookmark-Identifier header field 206 from the content request 300, the gateway 104 may, to make the determination, consult the lookup table or the Bookmark-Identifier header field 206 which may be returned as part of redirect message 308.

If the content request 300 was generated in response to invocation of a bookmarked link, the gateway 104 may then determine, at block 312, whether the bookmarked link on the client device 102 should be updated to reflect the redirect URL 108 as opposed to the bookmarked URL 106. Preferably, the gateway 104 may compare the bookmarked URL 106 to a list of network addresses that are not to be updated (a "DO NOT UPDATE" list). If the bookmarked URL 106 is not included in the DO NOT UPDATE list, the gateway may then determine that the bookmarked link on the client device 102 should be updated to reflect the redirect URL 108.

The DO NOT UPDATE list may be in any form that allows network addresses to be stored and retrieved. For example, the DO NOT UPDATE list may be a data table that contains URL addresses in data fields. The DO NOT UPDATE list may be stored on the gateway 104 or on another network device (not necessarily shown) accessible by the gateway 104.

If the bookmarked link is to be updated, gateway 104 may modify the redirect message 308, at block 314, by inserting into the redirect message 308 bookmark-update data instructing the client device 102 to update the bookmarked link to point to the redirect URL 108, thus establishing modified redirect message 316. Preferably, the bookmark-update data is in the form of a Bookmark-Update header field 208. The Bookmark-Update header field 208 preferably includes field content such as the redirect URL 108 address, or some other indicator that positively indicates that the mobile device 102 should update the bookmarked link to reflect the redirect URL 108 address. If the Bookmark-Update header field 208 does not include the redirect URL 108 address, the redirect URL 108 address may be contained elsewhere within the modified redirect message 316 or within another message transmitted to the mobile device 102.

After receiving the modified redirect message 316, the client device 102, at block 318, may update its bookmark to point to the redirect URL 108. The client device 102 may also resend its content request to the redirect URL 108 as the redirected request 320, and consequently, receive a content response 322 from the redirect URL 108.

Figure 4:
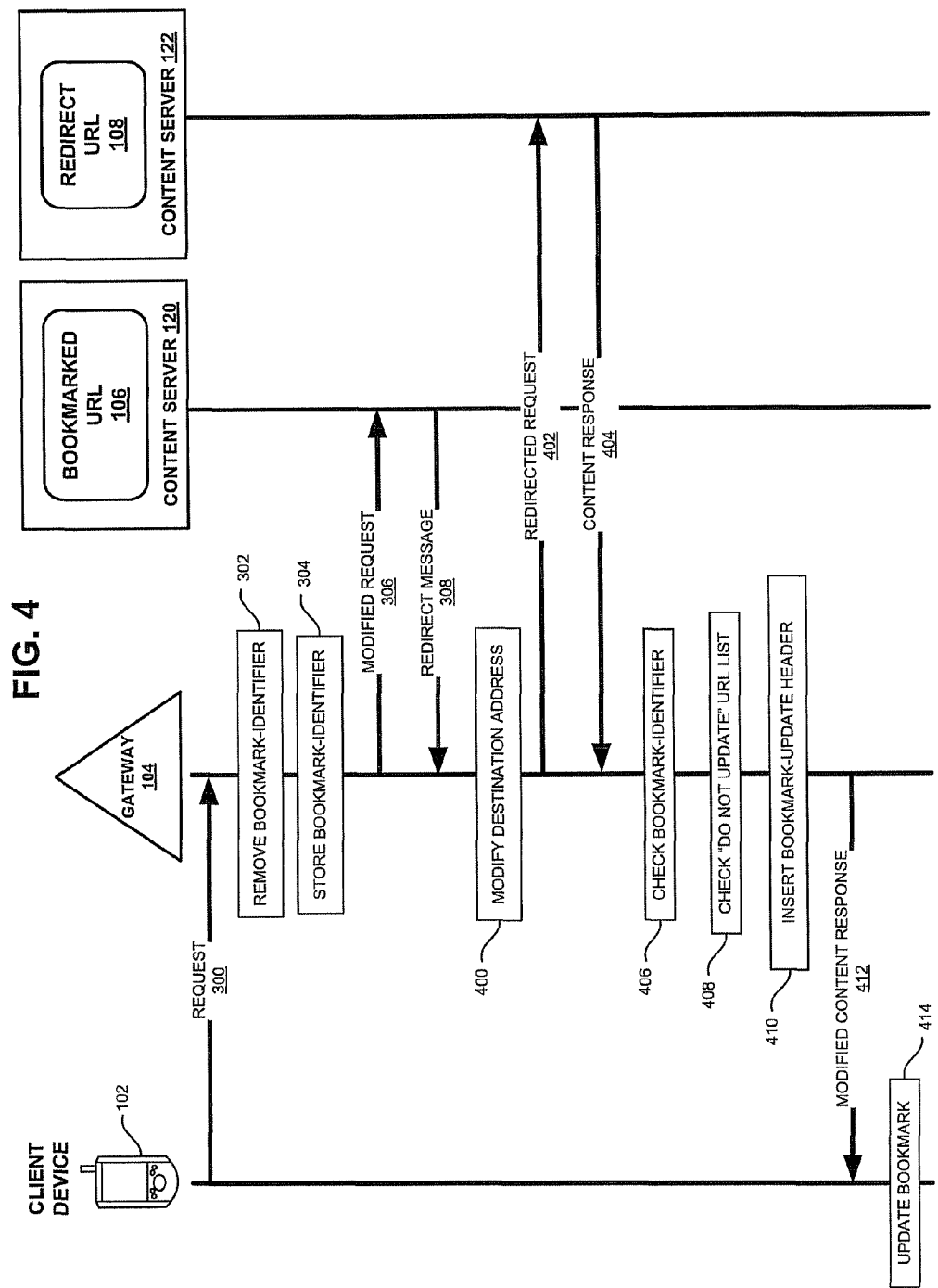
FIG. 4 is an exemplary message flow diagram illustrating an embodiment of the invention.

FIG. 4 is an exemplary message flow diagram illustrating another embodiment of this invention. The message flow described in FIG. 4 illustrates a method whereby the gateway, after receiving a redirect message, attempts to acquire and forward the content requested by the client device 102 instead of forwarding the modified redirect message 316 back to the client device 102. When compared to the message flow described FIG. 3, the method illustrated in FIG. 4 will further reduce the amount of traffic that the client device 102 must participate in.

FIG. 4 shares many elements in common with FIG. 3, including all steps up to and including the gateway 104 receiving the redirect message 308 from the content server 120 due to an invalid bookmarked URL 106 address. Upon receiving the redirect message 308, the gateway 104 may read the redirect URL 108 address contained within the redirect message 308. The gateway 104 may then, at block 400, establish a redirected content request 402 that is based on the request 300, but is directed instead to the redirect URL 108. The gateway 104 may then send the redirected request 402 to the redirect URL 108. The gateway 104 may then receive a content response 404 from the redirect URL 108 that is responsive to the redirected request 402.

Upon receipt of the content response 404, the gateway 104 may determine at block 406 whether the content request 300 was generated in response to invocation of a bookmarked link. If the gateway 104 removed the Bookmark-Identifier header field 206 from the content request 300, the gateway 104 can, for example, consult the lookup table to make the determination. The lookup table may be any table that holds relevant information pertinent to a particular user session. For example, the lookup table may be a session state registry that is preferably located at the gateway 104. If the gateway 104 did not remove the Bookmark-Identifier header field 206 from the content request 300, the gateway 104 may, to make the determination, consult the lookup table or the Bookmark-Identifier header field 206 which may be returned as part of received content response 404.

If the content request 300 was generated in response to invocation of a bookmarked link, the gateway 104 may then determine, at block 408, whether the bookmarked link on the client device 102 should be updated to reflect the redirect URL 108 as opposed to the bookmarked URL 106. Preferably, the gateway 104 may compare the bookmarked URL 106 to a list of network addresses that are not to be updated (the "DO NOT UPDATE" list). If the bookmarked URL 106 is not included in the DO NOT UPDATE list, the gateway may then determine that the bookmarked link on the client device 102 should be update to reflect the redirect URL 108.

If the bookmarked link is to be updated, gateway 104 may modify the content response 404 by inserting into the content response 404 bookmark-update data instructing the client device 102 to update the bookmarked link to point to the redirect URL 108, thus establishing modified content response message 412. Preferably, the bookmark-update data is in the form of a Bookmark-Update header field 208. The Bookmark-Update header field 208 preferably includes field content such as the redirect URL 108 address, or some other indicator that positively indicates that the mobile device 102 should update the bookmarked link to reflect the redirect URL 108 address. If the Bookmark-Update header field 208 does not include the redirect URL 108 address, the redirect URL 108 address may be contained elsewhere within the modified content response message 412 or within another message transmitted to the mobile device 102. After receiving the modified content response message 412, the client device 102, at block 414, may updated its bookmark to point to the redirect URL 108.

Figure 5:
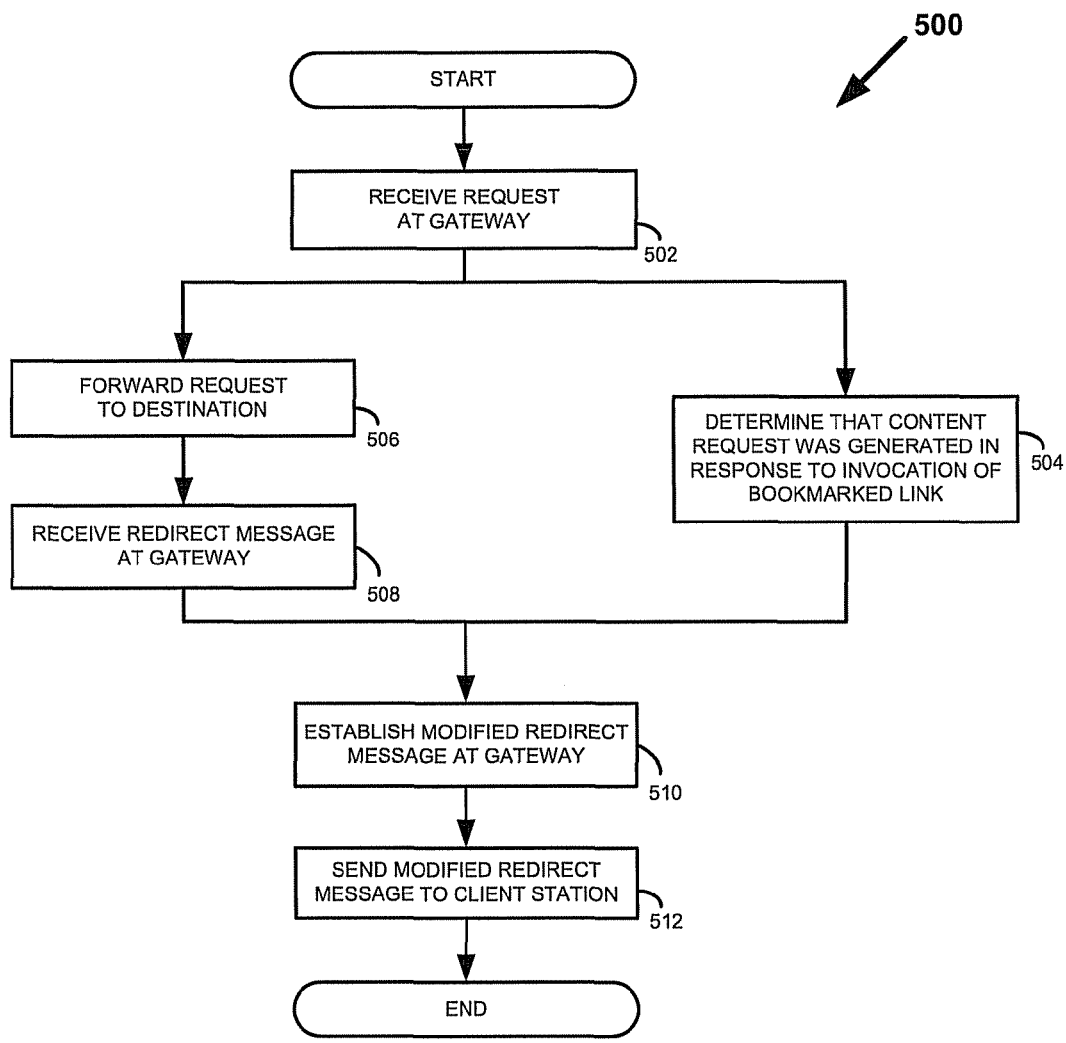
FIG. 5 is a flowchart illustrating a process carried out by a network gateway in accordance with an exemplary embodiment.

FIG. 5 illustrates a process 500 carried out by a network gateway in accordance with an exemplary embodiment of this invention. At block 502, the gateway may receive, from a client device, a content request directed to a first network address. For example, the content request might be an HTTP GET request directed to a URL. After receiving the content request, the gateway may determine, at block 504, that the request was generated in response to invocation of a bookmarked link on the client device. For example, the URL address may have been bookmarked on the client device and the device user may have invoked the bookmark, thus causing a content request to be generated and sent to the URL address. The gateway may make the determination by examining the content request for bookmark data (e.g., a Bookmark-Identifier) indicating that the content request was generated in response to invocation of the bookmarked link that the client device included within the content request. As an example, the gateway may determine that the content request was generated in response to invocation of the bookmarked link if the bookmark data is present or, alternatively, if the bookmark data contains some Boolean value equivalent to a value of "True."

Independent of the activity of block 504, at block 506, the gateway may forward the received content request to the first network address. Subsequent to sending the request, the gateway, at block 508, may receive a redirect message responsive to the content request. For example, the gateway may receive an HTTP 302 REDIRECT message. The redirect message may include a second network address as a redirect address. At block 510, subsequent to receiving the redirect message and responsive to the determination that the content request was generated in response to invocation of a bookmarked link, the gateway may establish a modified redirect message that includes bookmark-update data instructing the client device to update the bookmarked link to point to the second network address. As an example, the gateway may insert a Bookmark-Update field into the received HTTP 302 REDIRECT message. At block 512, the gateway may send the modified redirect message to the client device.

Figure 6:
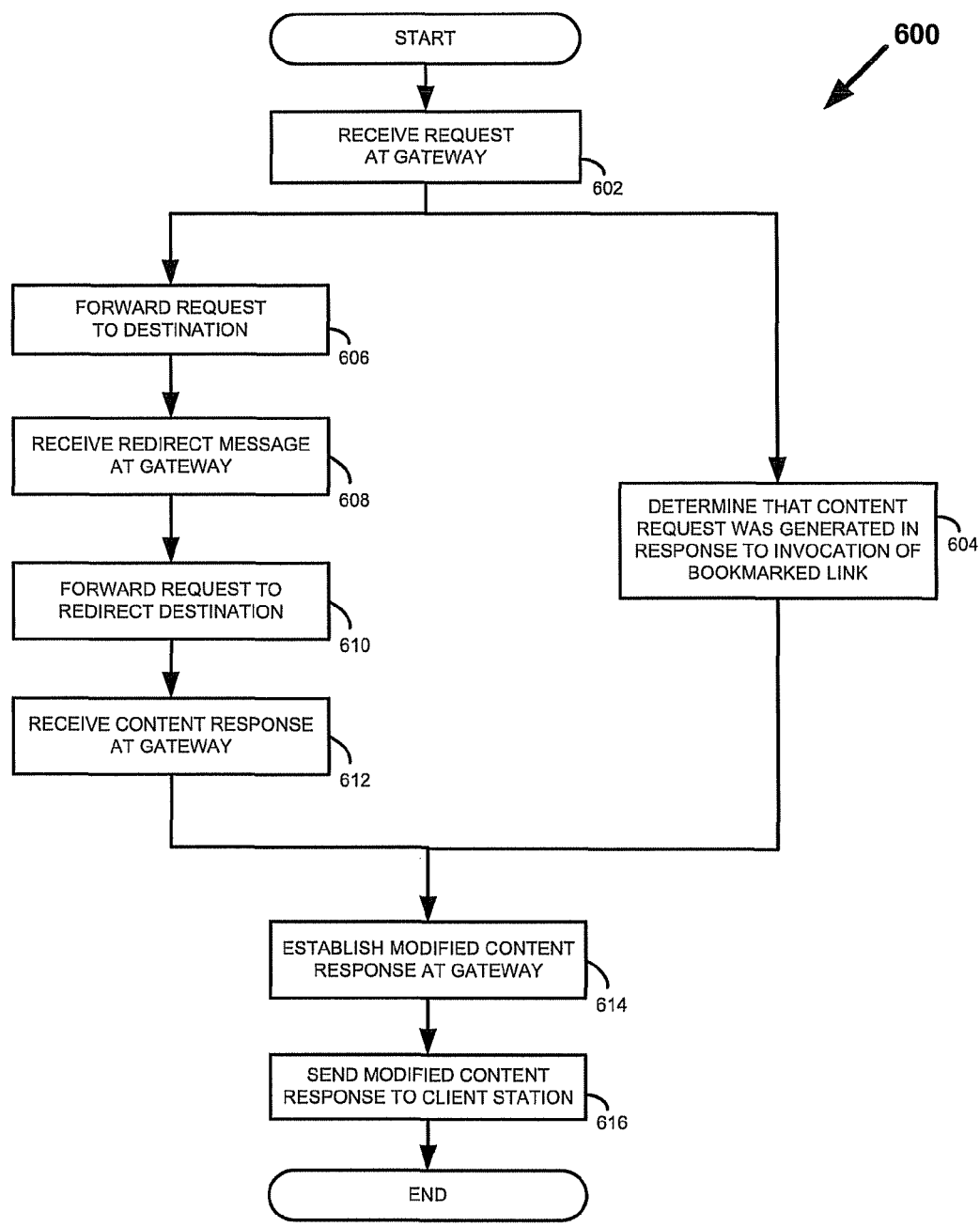
FIG. 6 is a flowchart illustrating a process carried out by a network gateway in accordance with an exemplary embodiment.

FIG. 6 illustrates a process 600 carried out by a network gateway in accordance with another exemplary embodiment of this invention. At block 602, the gateway may receive, from a client device, a content request directed to a first network address. For example, the content request might be an HTTP GET request directed to a URL. After receiving the content request, the gateway may determine, at block 604, that the request was generated in response to invocation of a bookmarked link on the client device. For example, the URL address may have been bookmarked on the client device and the device user may have invoked the bookmark, thus causing a content request to be generated and sent to the URL address. The gateway may make the determination by examining the content request for bookmark data (e.g., a Bookmark-Identifier) indicating that the content request was generated in response to invocation of the bookmarked link that the client device included within the content request. As an example, the gateway may determine that the content request was generated in response to invocation of the bookmarked link if the bookmark data is present or, alternatively, if the bookmark data contains some Boolean value equivalent to a value of "True."

Independent of the activity at block 604, at block 606, the gateway may forward the received content request to the first network address. Subsequent to sending the request, the gateway, at block 608, may receive a redirect message responsive to the content request. For example, the gateway may receive an HTTP 302 REDIRECT message. The redirect message may include a second network address as a redirect address. At block 610, subsequent to receiving the redirect message, the gateway may forward the content request from the gateway to the second network address. At block 612, the gateway may then receive a response to the content request that was forwarded to the second network address.

At block 614, subsequent to receiving the content response message and responsive to the determination that the content request was generated in response to invocation of a bookmarked link, the gateway may establish a modified content response message that includes bookmark-update data instructing the client device to update the bookmarked link to point to the second network address. As an example, the gateway may insert a Bookmark-Update header field 208 into the received content response message. At block 616, the gateway may send the modified content response message to the client device.

Figure 7:
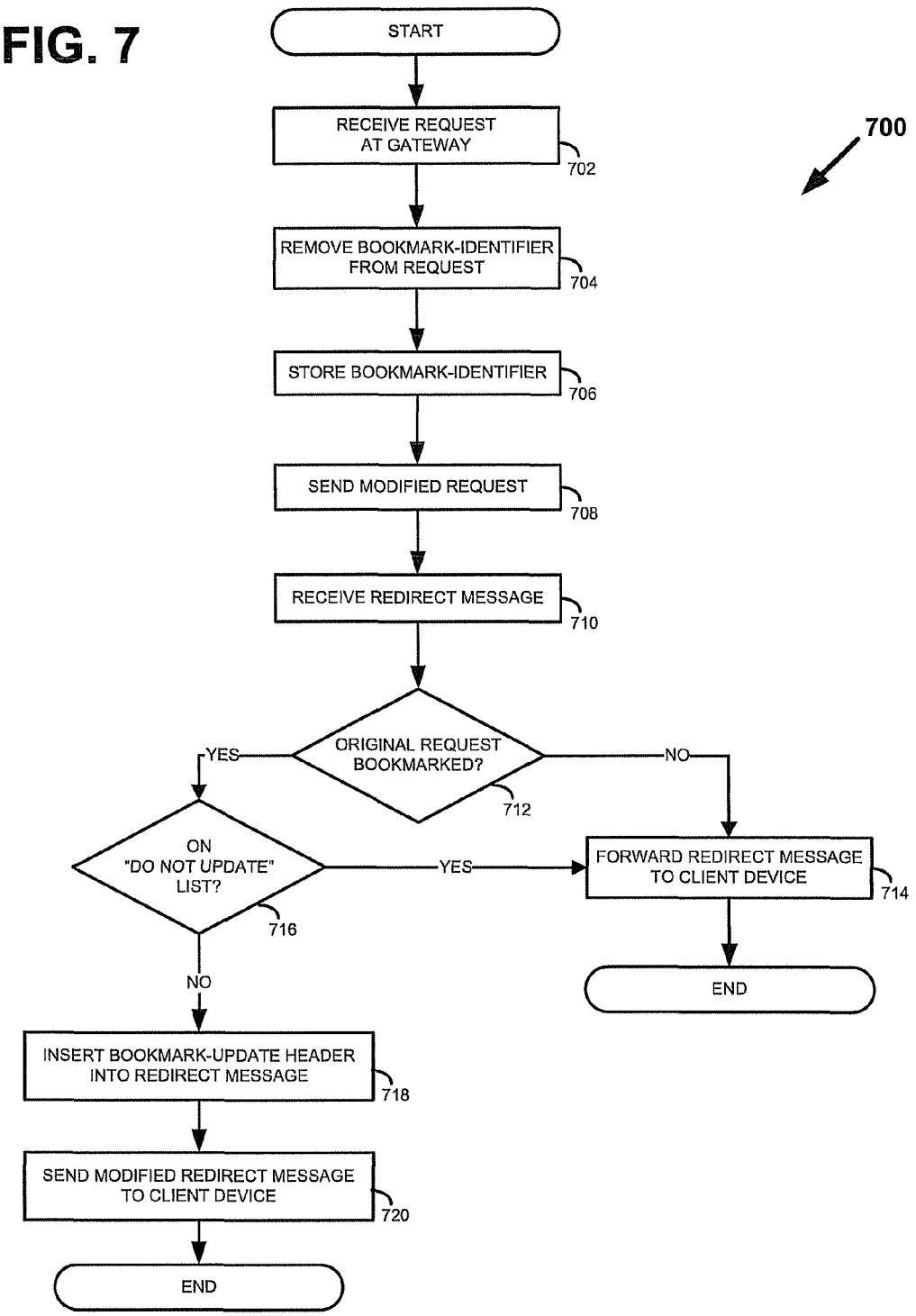
FIG. 7 is a flowchart illustrating a process carried out by a network gateway in accordance with an exemplary embodiment.

FIG. 7 illustrates a process 700 carried out by a network gateway in accordance with another embodiment of this invention. At block 702, the gateway may receive, from a client device, a content request that is directed to a first network address. The content request may contain bookmark data that indicates that the request was generated in response to a user invoking a bookmarked link on the client device. At block 704, the gateway may remove from the content request any bookmark data present within the content request and, at block 706, store the bookmark data for later retrieval. At block 708, the gateway may then forward the modified content request (i.e., the content request minus the bookmark data) to the first network address. The gateway may then, at block 710, receive a redirect message responsive to the content request. The redirect message may include a second network address as a redirect address.

After receiving the redirect message, the gateway may then determine, at block 712, whether the content request was generated in response to invocation of a bookmarked link on the client device. The gateway may make the determination by, for example, examining the stored bookmark data.

If the bookmark data indicates that the content request was not generated in response to invocation of a bookmarked link, then, at block 714, the gateway may forward the redirect message to the client device. If the bookmark data indicates that the content request was generated in response to invocation of a bookmarked link, then, at block 716, the gateway may compare the first network address to a list of network addresses that are not to be updated (i.e., the DO NOT UPDATE list). If the first network address is included within the DO NOT UPDATE list, the gateway may then, at block 714, forward the redirect message to the client device. If the first network address is not included in the DO NOT UPDATE list, the gateway may then, at block 718, insert bookmark-update data into the redirect message, where the bookmark-update data instructs the client device to update the bookmarked link to point to the second network address. At block 720, the gateway may then send the modified redirect message to the client device.

Figure 8:
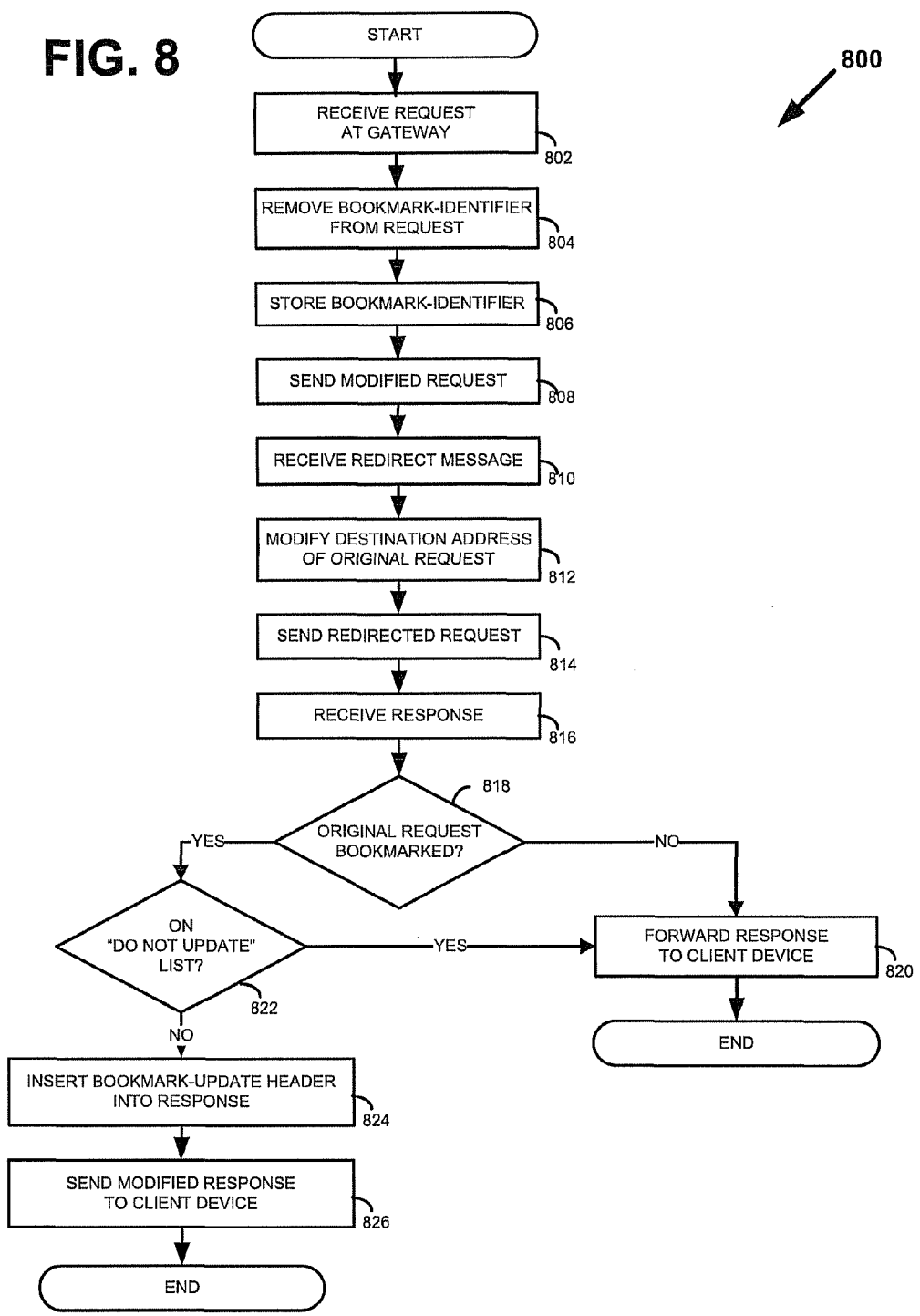
FIG. 8 is a flowchart illustrating a process carried out by a network gateway in accordance with an exemplary embodiment.

FIG. 8 illustrates a process 800 carried out by a network gateway in accordance with another embodiment of this invention. At block 802, the gateway may receive, from a client device, a content request that is directed to a first network address. The content request may contain bookmark data that indicates that the request was generated in response to a user invoking a bookmarked link on the client device. At block 804, the gateway may remove from the content request any bookmark data present within the content request and, at block 806, store the bookmark data for later retrieval. At block 808, the gateway may then forward the modified content request (i.e., the content request minus the bookmark data) to the first network address. The gateway may then, at block 810, receive a redirect message responsive to the content request. The redirect message may include a second network address as a redirect address.

After receiving the redirect message, the gateway may, at block 812, modify the destination address of the content request to reflect the second network address and then, at block 814, send the content request to the second network address. At block 816, the gateway may receive a response to the content request.

After receiving the content response message, the gateway may then determine, at block 818, whether the content request was generated in response to invocation of a bookmarked link on the client device. The gateway may make the determination by, for example, examining the stored bookmark data.

If the bookmark data indicates that the content request was not generated in response to invocation of a bookmarked link, then, at block 820, the gateway may forward the content response message to the client device. If the bookmark data indicates that the content request was generated in response to invocation of a bookmarked link, then, at block 822, the gateway may compare the first network address to a list of network addresses that are not to be updated (i.e., the DO NOT UPDATE list). If the first network address is included within the DO NOT UPDATE list, the gateway may then, at block 820, forward the content response message to the client device. If the first network address is not included in the DO NOT UPDATE list, the gateway may then, at block 824, insert bookmark-update data into the content response message, where the bookmark-update data instructs the client device to update the bookmarked link to point to the second network address. At block 826, the gateway may then send the modified content message to the client device.

Figure 9:
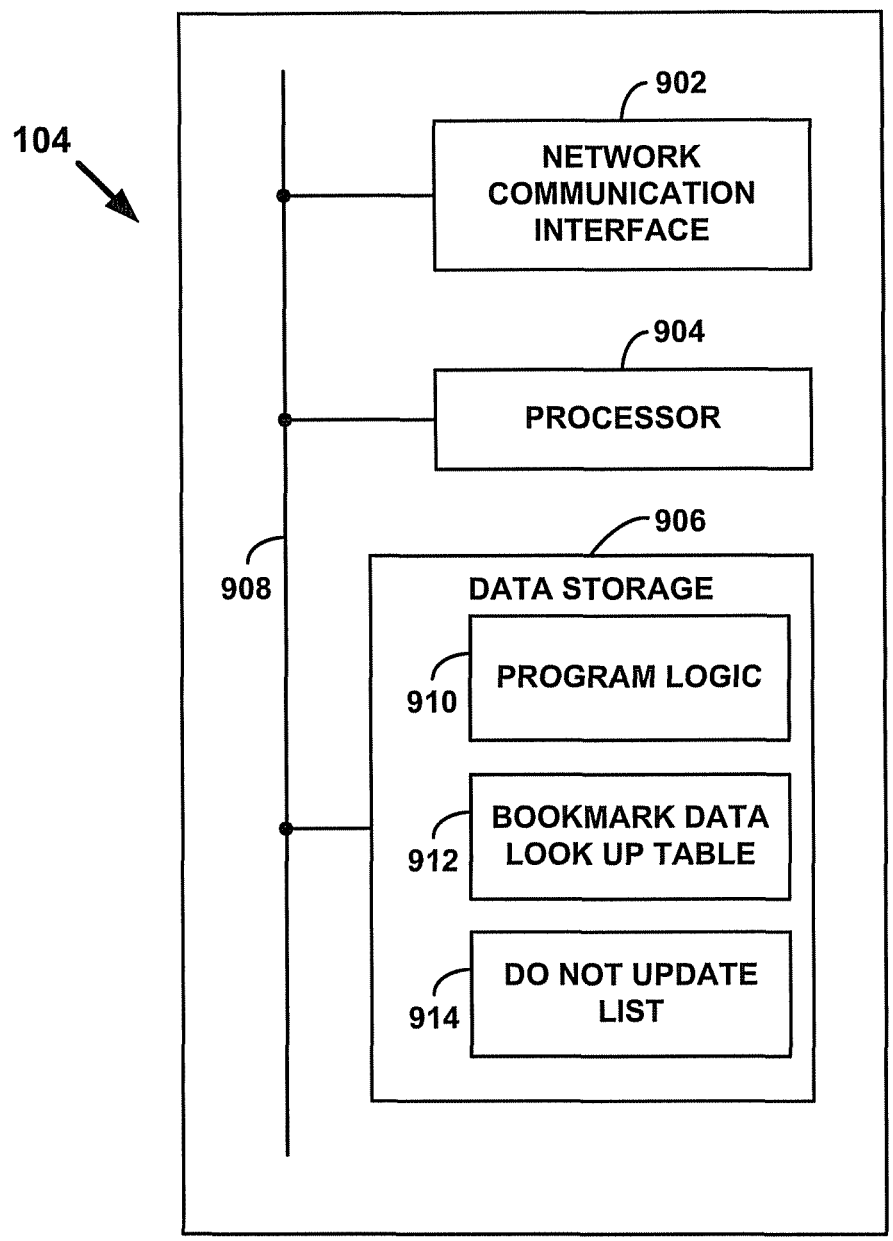
FIG. 9 is a block diagram illustrating exemplary components of a network gateway in accordance with an embodiment of the invention.

FIG. 9 is a block diagram illustrating exemplary components of a network gateway in accordance with an embodiment of the present invention. The gateway 104 may include a network communication interface 902, a processor (i.e., one or more processors) 904, and data storage 906, all of which are communicatively coupled through a system bus 908. Other arrangements are possible as well.

The network communication interface 902 may include a chipset for performing network communications. Performing network communications may include transmitting data using wireless connection or using a fixed, physical connection, such as metal wire or fiber optic cable. The chipset for performing wireline communications may be mounted on a network interface card (NIC). An exemplary NIC with a chipset for performing wireline communications according to the Institute of Electrical and Electronics Engineers (IEEE) 802.3® standard for Carrier Sense Multiple Access with Collision Detection (CSMA/CD) Access Method is the SP2610R Gigabit Ethernet Adapter NIC manufactured by the Spectrum Technologies Corporation of Taipei Hsien, Taiwan, Republic of China. Other examples of NICs with a chipset for performing wireline communications and other examples of wireline communication standards are also possible.

The network communication interface 902 may transmit various types of data through the packet-switched network 118 and/or receive various types of data through the packet-switched network 118. For example, the network communication interface 902 may receive at least one request for content sent from the client device 102 and may send at least one modified request for content to the content servers 120 and/or 122, both preferably in the form of IP packets that carry HTTP communications.

The data storage 906 may comprise one or more volatile and/or nonvolatile storage components such as magnetic, optical, or organic storage and may store various types of data. The data storage 906 may store data such as a lookup table 912 that contains includes bookmark data relating to individual content requests received by the gateway 104. The lookup table may be any table that holds relevant information pertinent to a particular user session. For example, the lookup table may be a session state registry. The data storage 906 may also store lists of network addresses, such as the DO NOT UPDATE list 914. The data storage 906 may also store program logic 910 (e.g., program instructions) executable by the processor 904. The program logic 910 may contain instructions executable by the processor 904 to provide services such as receiving requests for content, extracting information from those requests, storing information (e.g., bookmark data), looking up bookmark data and/or network address lists in data storage 906, modifying messages, and sending modified and unmodified messages to various network addresses.

In a preferred embodiment, the gateway 104 would be located as shown in FIG. 1. In such a location, the gateway 104 may easily intercept requests, response, and any other messages transmitted between the client device 102 and content servers 120 or 122. For example, the program logic 910 may contain instructions to sniff the header and/or data portions of each message passing through the gateway 104. If the message is a request for content sent from a client device, such as client device 102, and directed to a content server, such as content server 120, the gateway 104 may interrupt the transmission. If the message is an HTTP request for content, the processor 904 may pause transmission of the IP packet(s) that carry the HTTP message (i.e., temporarily pause the HTTP communication). Subsequently, the gateway 104, by means of the processor 904, may then use instructions in the program logic 910 to look for, and copy and/or remove, bookmark data from the request. The content request, either modified or unmodified, may then be forwarded by the gateway 104 to the content server 120 or 122. The foregoing example of program logic 910 instructions is intended to be exemplary only. It should be understood that the program instructions stored in the data storage 906 are executable by the processor 904 to carry out any of the gateway functions described herein.

As previously described, the gateway 104 need not be disposed between the PDSN 116 and the packet-switched network 118; instead, the gateway 104 can be disposed in the communication path anywhere downstream from the air interface 112. For example, the gateway 104 may be communicatively coupled to the packet-switched network 118 such that data communications between the client device 102 and content servers 120 or 122 are routed through the gateway 104. As an example, the gateway 104 may be located in the same local network as the content servers 120 or 122 and be able to intercept messages directed to network entities on that local network, including messages directed to the content servers 120 or 122. To accomplish this, the gateway 104 may have the same TCP/IP prefix as the content servers 120 or 122. Further, the gateway 104 or another network entity may have program logic that includes instructions to substitute the gateway as the destination for messages that were received into the local network from a client device 102 and originally directed to the content servers 120 or 122.

The invention described herein is beneficial for at least the following reasons. The embodiment described in FIG. 3 may reduce network traffic over time by correcting invalid bookmarks that are stored on a client device. Without the invention, each and every time an invalid bookmark is invoked on the client device, the client device may send a request, receive a redirect message, and then send a new request before receiving the desired content. This unnecessarily burdens the network infrastructure. The embodiment described in FIG. 4 further improves network traffic by preventing redirect messages from being broadcast to the client device, thus freeing up additional network wireless or wireline bandwidth.

Another benefit provided by the invention is that service providers may better control how their traffic is directed. For example, if a service provider wishes for users to access specific pages only through a link on a portal page, the service provider can instruct a client device to update any invoked bookmarks pointing to those specific pages to point instead to the portal page. This can aid the service provider in efforts to profile the user of the client device or to better track traffic through various network addresses.

Exemplary embodiments of the present invention have been shown and described. Other examples within the scope of the claimed invention are possible. For example, the client device 102 may communicate solely via a wireline interface, instead of the exemplary wireless interface 112 described with respect to FIG. 1. As another example, the gateway may instead be any network intermediary, such as a proxy server or a web portal, for example. Those of ordinary skill in the art will appreciate that numerous modifications from the embodiments described are possible, while remaining within the scope of the claims.

We claim:

1. A method comprising:
 receiving at a gateway, from a client device, a content request directed to a first network address, and forwarding the content request to the first network address;
 determining at the gateway that the content request was generated in response to invocation of a bookmarked link;
 receiving at the gateway a redirect message generated in response to the content request, wherein the redirect message designates a second network address as a redirect address; and
 responsive to the determining, establishing at the gateway a modified redirect message that includes bookmark-update data instructing the client device to update the bookmarked link to point to the second network address, and sending the modified redirect message rather than the received redirect message to the client device,
 whereby, upon receipt of the modified redirect message, the client device responsively updates the bookmarked link to point to the second network address.

2. The method of claim 1, wherein determining at the gateway that the content request was generated in response to invocation of a bookmarked link comprises determining at the gateway that the content request contains bookmark data indicating that the content request was generated in response to invocation of the bookmarked link.

3. The method of claim 2, wherein forwarding the content request to the first network address comprises:
 removing the bookmark data from the content request and forwarding the content request, without the bookmark data, to the first network address.

4. The method of claim 2, wherein the bookmark data is contained in a Hypertext Transfer Protocol (HTTP) header field of the content request.

5. The method of claim 1, wherein the bookmark-update data is contained in a Hypertext Transfer Protocol (HTTP) header field of the modified redirect message.

6. The method of claim 1, further comprising:
 making a first determination at the gateway of whether the bookmarked link should be updated; and
 conditioning the establishing on the first determination being that the bookmarked link should be updated.

7. The method of claim 6, further comprising:
 comparing the first network address to a list of network addresses that are not to be updated, and making a second determination of whether the first network address is included in the list of network addresses; and
 conditioning the establishing on the second determination being that the first network address is not in the list of network addresses.

8. The method of claim 1, further comprising:
 receiving the modified redirect message at the client device; and
 the client device responsively updating the bookmarked link to point to the second network address.

9. The method of claim 1, wherein the redirect message is a Hypertext Transfer Protocol (HTTP) 3xx series redirect message.

10. A method comprising:
 receiving at a gateway, from a client device, a content request directed to a first network address, and forwarding the content request to the first network address;
 determining at the gateway that the content request was generated in response to invocation of a bookmarked link;
 receiving at the gateway a redirect message generated in response to the content request, wherein the redirect message designates a second network address as a redirect address;
 forwarding the content request from the gateway to the second network address;
 receiving at the gateway a response to the content request;
 responsive to the determining and the receiving of the response to the content request, establishing at the gateway a modified response message that includes bookmark-update data instructing the client device to update the bookmarked link to point to the second network address, and sending to the client device the modified response message rather than the received response,
 whereby, upon receipt of the modified response message, the client device responsively updates the bookmarked link to point to the second network address.

11. The method of claim 10, wherein determining at the gateway that the content request was generated in response to invocation of a bookmarked link comprises determining at the gateway that the content request contains bookmark data indicating that the content request was generated in response to invocation of the bookmarked link.

12. The method of claim 11, wherein forwarding the content request to the first network address comprises:
 removing the bookmark data from the content request and forwarding the content request, without the bookmark data, to the first network address.

13. The method of claim 11, wherein the bookmark data is contained in a Hypertext Transfer Protocol (HTTP) header field of the content request.

14. The method of claim 10, wherein the bookmark-update data is contained in a Hypertext Transfer Protocol (HTTP) header field of the modified response message.

15. The method of claim 10, further comprising:
 making a first determination at the gateway of whether the bookmarked link should be updated; and
 conditioning the establishing on the first determination being that the bookmarked link should be updated.

16. The method of claim 15, further comprising:
 comparing the first network address to a list of network addresses that are not to be updated, and making a second determination of whether the first network address is included in the list of network addresses; and
 conditioning the establishing on the second determination being that the first network address is not in the list of network addresses.

17. The method of claim 10, further comprising:
receiving the modified response message at the client device; and
the client device responsively updating the bookmarked link to point to the second network address.

18. The method of claim 10, wherein the redirect message is a Hypertext Transfer Protocol (HTTP) 3xx series redirect message.

19. A network gateway comprising:
a network interface for providing connectivity with a network;
a processor;
data storage; and
program instructions stored in the data storage and executable by the processor to carry out functions including:
  (i) receiving at the network gateway a redirect message generated in response to a content request, wherein the content request originated from a client device;
  (ii) modifying the redirect message by inserting bookmark-update data that instructs the client device to update a bookmarked link; and
  (iii) sending the modified redirect message to the client device.

* * * * *